(12) United States Patent
Dang

(10) Patent No.: US 9,992,321 B2
(45) Date of Patent: Jun. 5, 2018

(54) MOBILE TERMINAL WITH A BUILT-IN VOICE MESSAGE SEARCHING FUNCTION AND CORRESPONDING SEARCHING METHOD

(71) Applicant: ZTE Corporation, Shenzhen, Guangdong (CN)

(72) Inventor: Zheng Dang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 351 days.

(21) Appl. No.: 14/649,658

(22) PCT Filed: Jul. 9, 2013

(86) PCT No.: PCT/CN2013/079091
§ 371 (c)(1),
(2) Date: Jun. 4, 2015

(87) PCT Pub. No.: WO2013/167023
PCT Pub. Date: Nov. 14, 2013

(65) Prior Publication Data
US 2015/0319286 A1    Nov. 5, 2015

(30) Foreign Application Priority Data

Dec. 4, 2012  (CN) .......................... 2012 1 0512740

(51) Int. Cl.
*H04M 1/725* (2006.01)
*H04W 28/04* (2009.01)
(Continued)

(52) U.S. Cl.
CPC .. *H04M 1/72547* (2013.01); *G06F 17/30743* (2013.01); *G10L 15/10* (2013.01);
(Continued)

(58) Field of Classification Search
CPC ........... H04M 1/72547; H04M 3/5307; H04M 3/533; H04M 1/72552; H04M 2250/74;
(Continued)

(56) References Cited

U.S. PATENT DOCUMENTS 9,263,059 B2 *  2/2016  Bell ........................ G10L 25/54
2005/0096899 A1  5/2005  Padhi
(Continued)

FOREIGN PATENT DOCUMENTS

CN          1369999 A      9/2002
CN       101414412 A      4/2009
(Continued)

OTHER PUBLICATIONS

Supplementary European Search Report in European application No. 13788386.4, dated Nov. 6, 2015.
(Continued)

*Primary Examiner* — Joseph Dean, Jr.
(74) *Attorney, Agent, or Firm* — Oppedahl Patent Law Firm LLC

(57) ABSTRACT

A mobile terminal with a built-in voice message searching function includes: a voice recording module configured to record a voice searching signal from a user and to send the voice searching signal to the pre-processing module for pre-processing, a pre-processing module configured to pre-process the voice searching signal, and to send the pre-processed signal to the matching module for signal matching, a matching module configured to extract a characteristic parameter of the pre-processed signal, to calculate a similarity of the extracted characteristic parameter with a characteristic parameter of a stored voice message, and to send the voice message with a similarity higher than or equal to a threshold to the result outputting module, and a result outputting module configured to display the voice message
(Continued)

with the similarity higher than or equal to the threshold on a screen of the mobile terminal.

6 Claims, 2 Drawing Sheets

(51) Int. Cl.
    *H04W 4/12* (2009.01)
    *H04M 3/53* (2006.01)
    *H04L 12/58* (2006.01)
    *H04W 4/14* (2009.01)
    *H04W 88/02* (2009.01)
    *G06F 17/30* (2006.01)
    *G10L 15/10* (2006.01)
    *H04M 3/533* (2006.01)

(52) U.S. Cl.
    CPC ........ *H04L 51/38* (2013.01); *H04M 1/72552* (2013.01); *H04M 3/533* (2013.01); *H04M 3/5307* (2013.01); *H04W 4/12* (2013.01); *H04W 28/04* (2013.01); *H04M 2250/74* (2013.01); *H04W 4/14* (2013.01); *H04W 88/02* (2013.01)

(58) Field of Classification Search
    CPC ....... H04W 28/048; H04W 4/12; H04W 4/14; H04W 88/02; H04L 51/38; G06F 17/30743; G10L 15/10
    See application file for complete search history.

(56) References Cited

U.S. PATENT DOCUMENTS

| | | | | |
|---|---|---|---|---|
| 2007/0100609 | A1* | 5/2007 | Kim | G10L 25/87 704/211 |
| 2009/0292692 | A1* | 11/2009 | Kaihotsu | G06F 17/30657 |
| 2010/0106510 | A1* | 4/2010 | Topchy | G11B 20/10 704/500 |
| 2010/0154015 | A1 | 6/2010 | Kang | |
| 2010/0305948 | A1 | 12/2010 | Simone | |
| 2012/0041760 | A1* | 2/2012 | Kang | G11B 20/10527 704/201 |
| 2013/0236032 | A1* | 9/2013 | Wakeland | G10L 19/002 381/104 |
| 2013/0259211 | A1* | 10/2013 | Vlack | G06F 17/30743 379/88.01 |
| 2013/0322633 | A1* | 12/2013 | Stone | H04S 3/00 381/2 |
| 2013/0345840 | A1* | 12/2013 | Lempel | G06Q 30/0255 700/94 |

FOREIGN PATENT DOCUMENTS

| | | |
|---|---|---|
| CN | 102523349 A | 6/2012 |
| EP | 1315098 A1 | 5/2003 |
| GB | 2231698 A | 11/1990 |
| JP | 2004286834 A | 10/2004 |

OTHER PUBLICATIONS

Wikipedia:"Normalization (statistics)", Nov. 28, 2011 (Nov. 28, 2011), Retrieved from the Internet: URL:https://web.archive.org/web/20111128013152/http://en.wikipedia.org/wiki/Normalization_%28statistics%29 [retrieved on Feb. 10, 2017] printed Feb. 23, 2017.

Wikipedia:"Nyquist Shannon sampling theorem", Sep. 22, 2012 (Sep. 22, 2012), Retrieved from the Internet: URL:https://web.archive.org/web/20120922040541 /http://en.wikipedia.org/wiki/Nyquist%E2%8093Shannon_sampling_theorem [retrieved on Feb. 10, 2017] printed Feb. 23, 2017.

International Search Report in international application No. PCT/CN2013/079091, dated Oct. 10, 2013.

English Translation of the Written Opinion of the International Search Authority in international application No. PCT/CN2013/079091, dated Oct. 10, 2013.

* cited by examiner

MOBILE TERMINAL WITH A BUILT-IN VOICE MESSAGE SEARCHING FUNCTION AND CORRESPONDING SEARCHING METHOD

TECHNICAL FIELD

The disclosure relates to the field of information searching in mobile terminal technology, in particular to a mobile terminal with a built-in voice message searching function and corresponding searching method.

BACKGROUND

The voice message service means that a user could record his voice with a mobile terminal such as a cell phone and send the recorded voice to one or more friends for listening. Furthermore, the user may also perform operations, such as reception, forwarding, inquiry, reply or playing on-demand of a voice message, according to the prompt tone of the mobile terminal, for example a cell phone. Voice messages compensates for the difficulty in delivering voice and inconvenience in information input for traditional text messages, therefore solving the problem that those persons who do not use the short messaging service because of being unfamiliar with Chinese phonetic alphabet cannot communicate with others with messages.

Whereas, since a voice message received by a user is an audio file sent from a sender, it is impossible for the user to view the voice message intuitively. When a mobile terminal such as a cell phone has a large number of messages stored locally, it is extremely hard for the user to find out a specific voice message. Therefore, voice message searching is very inconvenient, which greatly reduces user experience.

SUMMARY

According to the embodiments of the disclosure, provided is a mobile terminal with a built-in voice message searching function and corresponding searching method, which can implement searching among voice messages stored in a mobile terminal readily.

An embodiment of the disclosure provides a mobile terminal with a built-in voice message searching function, which includes a voice recording module, a pre-processing module, a matching module and a result outputting module;

the voice recording module is configured to record a voice searching signal from a user, and to send the voice searching signal to the pre-processing module for pre-processing;

the pre-processing module is configured to pre-process the voice searching signal, and to send the pre-processed signal to the matching module for signal matching;

the matching module is configured to extract a characteristic parameter of the pre-processed signal, to calculate a similarity of the extracted characteristic parameter with a characteristic parameter of a stored voice message, and to send the voice message with a similarity higher than or equal to a threshold to the result outputting module; and the result outputting module is configured to display the voice message with the similarity higher than or equal to the threshold on a screen of the mobile terminal.

In an embodiment, the result outputting module is further configured to prompt the user whether a further search is to be performed when there are more than one voice messages with similarities higher than or equal to the threshold.

In an embodiment, the pre-processing module includes: a signal normalization module, a signal down-sampling module, an anti-aliasing filtering module, a signal amplifying module, an endpoint detecting module and a noise filtering module;

the signal normalization module is configured to normalize amplitude, frequency and phase of the voice searching signal into a unified amplitude, frequency and phase respectively, and to send the normalized signal to the signal down-sampling module;

the signal down-sampling module is configured to sample the normalized signal at a low frequency, and to send the sampled signal to the anti-aliasing filtering module;

the anti-aliasing filtering module is configured to filter aliasing frequency components from the down-sampled signal, and to send the signal after the aliasing frequency component filtering to the signal amplifying module;

the signal amplifying module is configured to amplify the signal after the aliasing frequency component filtering, and to send the amplified signal to the endpoint detecting module;

the endpoint detecting module is configured to determine a starting point and an ending point of a valid voice signal in the amplified signal, and to send the valid voice signal to the noise filtering module; and the noise filtering module is configured to filter noise from the valid voice signal, and to send the signal after the noise filtering to the matching module for signal matching.

In an embodiment, the unified amplitude, frequency and phase are set respectively to be audible amplitude, frequency and phase; and the low frequency in the low-frequency sampling is higher than twice of a maximum frequency of the sampled signal.

In an embodiment, the matching module includes: a characteristic extracting module, a similarity measuring module and a voice message library, wherein the characteristic extracting module is configured to extract a characteristic parameter from the pre-processed signal, and to send the extracted characteristic parameter to the similarity measuring module;

the similarity measuring module is configured to calculate the similarity of the extracted characteristic parameter with a characteristic parameter of a voice message sent by the voice message library module, and to send the voice message with the similarity higher than or equal to the threshold to the resulting outputting module; and the voice message library module is configured to store the characteristic parameters of voice messages, and to send the characteristic parameter of each of the voice message to the similarity measuring module for similarity calculation.

In an embodiment, the characteristic parameter includes: linear prediction coefficient, linear prediction cepstrum coefficient and Mer-Frequency cepstrum coefficient;

the similarity calculation includes: Euclidean distance similarity calculation, cosine similarity calculation, Manhattan distance calculation and grey relational degree calculation.

The embodiments of the disclosure provide a searching method of a mobile terminal with a built-in voice message searching function, comprising:

recording a voice searching signal from a user, and pre-processing the voice searching signal;

extracting a characteristic parameter of the pre-processed signal, and calculating a similarity of the extracted characteristic parameter with a characteristic parameter of a stored voice message;

displaying the voice message with the similarity higher than or equal to the threshold on a screen of the mobile terminal.

In an embodiment, the pre-processing the voice searching signal includes:

normalizing amplitude, frequency and phase of the voice searching signal into a unified amplitude, frequency and phase respectively; sampling the normalized signal at a low frequency; filtering aliasing frequency components from the down-sampled signal and amplifying the filtered signal; determining a starting point and an ending point of a valid voice signal in the amplified signal; filtering noise from the valid voice signal.

In an embodiment, when there are more than one voice messages with similarities greater than or equal to a threshold, the method further includes: prompting, by the mobile terminal, a user whether a further search is to be performed.

With the mobile terminal with a built-in voice message searching function and corresponding searching method according to the embodiments of the disclosure, the voice recording module records a voice searching signal, the pre-processing module pre-processes the voice searching signal, the matching module calculates a similarity between the voice searching signal and a stored voice message, and the result outputting module displays the voice message with a similarity higher than or equal to a threshold on the screen of the mobile terminal in tabular form.

Preferably, when there are more than one voice messages with similarities higher than or equal to the threshold, the result outputting module prompt the user whether a further search is to be performed, and in this way, it is possible to perform a further research among the voice messages searched out previously by recording a further voice searching signal.

DETAILED DESCRIPTION

In order to better understand the features and technical contents of the embodiments of the disclosure, the embodiments of the disclosure are now described in detail in combination with accompanying drawings, which are only used for illustration purpose without limiting the embodiments of the disclosure.

Figure 1:
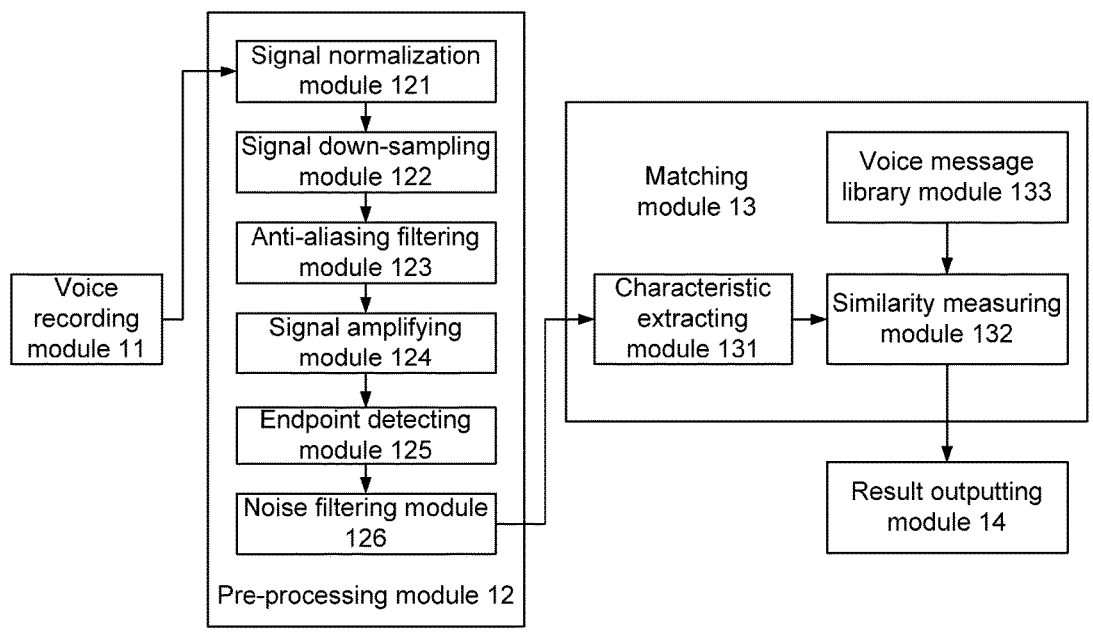
FIG. 1 is a structural schematic view of the mobile terminal with a built-in voice message searching function according to the embodiments of the disclosure.

FIG. 1 is a structural schematic view of the mobile terminal with a built-in voice message searching function according to the embodiments of the disclosure. As shown in FIG. 1, this mobile terminal includes: a voice recording module 11, a pre-processing module 12, a matching module 13 and a result outputting module 14.

The voice recording module 11 is configured to record a voice searching signal from a user, and to send the voice searching signal to the pre-processing module 12 for pre-processing.

The pre-processing module 12 is configured to receive the voice searching signal sent from the voice recording module 11, to pre-process the voice searching signal, and to send the pre-processed signal to the matching module 13 for signal matching.

The matching module 13 is configured to receive the pre-processed signal sent from the pre-processing module, to extract a characteristic parameter of the pre-processed signal, to calculate a similarity of the extracted characteristic parameter with a characteristic parameter of a stored voice message, and to send the voice message with a similarity higher than or equal to a threshold to the result outputting module 14.

The result outputting module 14 is configured to receive the voice message with the similarity higher than or equal to the threshold, to display the voice message with the similarity higher than or equal to the threshold on a screen of the mobile terminal in tabular form.

Here, the tabulation includes at least one voice message item arranged longitudinally on the screen of mobile terminal. The voice message item includes a voice message connection identifier, and may further include one or more of voice message creation time, voice message duration, voice message size. The voice message connection identifier, the voice message creation time, the voice message duration, and the voice message size are arranged on the screen of the mobile terminal horizontally.

The threshold herein is a set similarity threshold value. A similarity greater than or equal to the threshold signifies existence of the voice searching signal in the voice message, and a similarity smaller than the threshold signifies absence of the voice searching signal in the voice message.

In an embodiment, the voice searching signal may be a key word or key sentence of the voice message, which is at least one voice message stored in the mobile terminal.

Preferably, the result outputting module 14 is further configured to, when there are more than one voice messages with similarities greater than or equal to the threshold, prompt the user whether a further search is to be performed. Accordingly, during the further searching, the voice recording module 11 records a voice searching signal as a second key word or key sentence; the matching module 13 calculates a similarity of the second key word or key sentence with those previously searched out voice messages with the similarities greater than or equal to the threshold, wherein the second key word or key sentence is different from that used in the previous searching.

Preferably, the pre-processing module 12 includes: a signal normalization module 121, a signal down-sampling module 122, an anti-aliasing filtering module 123, a signal amplifying module 124, an endpoint detecting module 125 and a noise filtering module 126.

The signal normalization module 121 is configured to receive the voice searching signal sent from the voice recording module 11, to normalize amplitude, frequency and phase of the voice searching signal into a unified amplitude, frequency and phase respectively, and to send the normalized signal to the signal down-sampling module 122.

The signal down-sampling module 122 is configured to receiving the signal sent from the signal normalization module 121, to sample the normalized signal at a low frequency, and to send the sampled signal to the anti-aliasing filtering module 123.

The anti-aliasing filtering module 123 is configured to receive the signal sent from the signal down-sampling module 122, to filter aliasing frequency components from the down-sampled signal, and to send the signal after the aliasing frequency component filtering to the signal amplifying module 124.

The signal amplifying module 124 is configured to receive the signal sent from the anti-aliasing filtering module 123, to amplify the signal after the aliasing frequency component filtering, and to send the amplified signal to the endpoint detecting module 125.

The endpoint detecting module 125 is configured to receiving the signal sent from the signal amplifying module 124, to determine a starting point and an ending point of a valid voice signal in the amplified signal, and to send the valid voice signal to the noise filtering module 126.

The noise filtering module 126 is configured to receive the valid voice signal sent from the endpoint detecting module 125, to filter noise from the valid voice signal, and to send the signal after the noise filtering to the matching module 13 for signal matching.

In an embodiment, the unified amplitude, frequency and phase are set respectively to be a certain audible amplitude, frequency and phase.

The low frequency in the low-frequency sampling is higher than twice of a maximum frequency of the sampled signal, so that the low frequency is high enough.

Preferably, the matching module 13 includes: a characteristic extracting module 131, a similarity measuring module 132 and a voice message library 133.

The characteristic extracting module 131 is configured to receive the pre-processed signal sent from the pre-processing module 12, to extract a characteristic parameter from the pre-processed signal, and to send the extracted characteristic parameter to the similarity measuring module 132;

The similarity measuring module 132 is configured to receive the characteristic parameter sent from the characteristic extracting module 131, to calculate the similarity of the extracted characteristic parameter with a characteristic parameter of a voice message sent by the voice message library module 133, and to send the voice message with the similarity higher than or equal to the threshold to the resulting outputting module 14.

The voice message library module 133 is configured to store the characteristic parameters of voice messages, and to send the characteristic parameter of each of the voice message to the similarity measuring module 132 for similarity calculation.

In an embodiment, the characteristic parameter includes: linear prediction coefficient, linear prediction cepstrum coefficient and Mer-Frequency cepstrum coefficient, etc.

Taking Mer-Frequency cepstrum coefficient as an example, extracting the characteristic parameter may specifically includes the following:

performing framing, windowing and Discrete Fourrier Transform DFT on the pre-processed signal to obtain spectrum distribution information; squaring the spectrum amplitude to obtain an energy spectrum; performing filtering on the energy spectrum with a triangular filter bank in Mer-scale and then performing Discrete Cosine Transform DCT on the filtered energy spectrum to obtain the Mer-Frequency cepstrum coefficient; performing a vector quantization on the Mer-Frequency cepstrum coefficient.

In this case, the vector quantization of the characteristic parameter such as Mer-Frequency cepstrum coefficient may be implemented by Principal Component Analysis PCA, Support Vector Machine SVM or Wavelet Transform WT.

In the above schema, the method of the similarity calculation may be Euclidean distance similarity calculation, cosine similarity calculation, Manhattan distance calculation or grey relational degree calculation, etc.

Taking Euclidean distance similarity calculation as an example, the similarity calculation is specifically:

$$d_2(X, Y) = \frac{1}{K} \sum_{i=1}^{K} (x_i - y_i)^2$$

$$Xi = \{x_{i1}, x_{i2}, \ldots, x_{ik}\}$$

$$Yi = \{Y_{j1}, Y_{j2}, \ldots, Y_{jk}\}$$

where, $X_i$ is the characteristic parameter vector of the signal, $Y_i$ is the characteristic parameter vector of one voice message, $d_2(X,Y)$ is Euclidean distance similarity;

$$\sum_{i=1}^{K}$$

is a summation symbol, i=1, 2, 3 . . . K. The Euclidean distance similarity characterizes the level of similarity between the signal and the voice message. A larger Euclidean distance similarity represents a smaller similarity, and a smaller Euclidean distance similarity represents a larger similarity.

Figure 2:
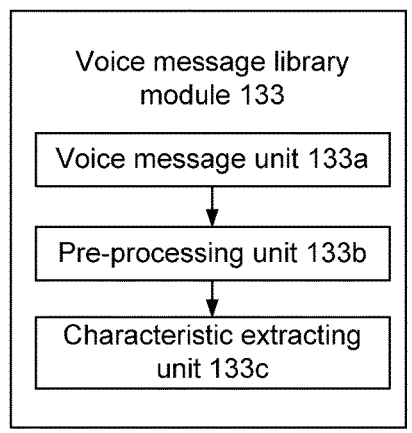
FIG. 2 is a structural schematic view of the voice message library module according to the embodiments of the disclosure.

FIG. 2 is a structural schematic view of the voice message library module according to the embodiments of the disclosure. As shown in FIG. 2, the voice message library module includes a voice message unit 133a, a pre-processing unit 133b, a characteristic extracting unit 133c.

The voice message unit 133a is configured to store a recorded voice message and to send the voice message to the pre-processing unit 133b for pre-processing.

The pre-processing unit 133b is configured to receive the voice message sent from the voice message unit 133a, to pre-process the voice message, and to send the pre-processed signal which has been pre-processed to the characteristic extracting unit 133c.

The characteristic extracting unit 133c is configured to receive the pre-processed signal sent from the pre-processing unit 133b and to extract a characteristic parameter from the pre-processed signal.

In an embodiment, pre-processing the voice message may specifically include: normalizing amplitude, frequency and phase of the voice searching signal into a unified amplitude, frequency and phase respectively; sampling the normalized signal at a low frequency; filtering aliasing frequency components from the down-sampled signal; then, amplifying the filtered signal; determining a starting point and an ending point of a valid voice signal in the amplified signal; finally, filtering noise from the valid voice signal.

In an embodiment, the characteristic parameter includes: linear prediction coefficient, linear prediction cepstrum coefficient and Mer-Frequency cepstrum coefficient, etc.

Taking Mer-Frequency cepstrum coefficient as an example, extracting the characteristic parameter may specifically include:

performing framing, windowing and Discrete Fourrier Transform DFT on the signal to obtain spectrum distribution information; squaring the spectrum amplitude to obtain an energy spectrum; performing filtering on the energy spectrum with a triangular filter bank in Mer-scale and performing Discrete Cosine Transform DCT on the filtered energy spectrum to obtain the Mer-Frequency cepstrum coefficient; performing a vector quantization on the Mer-Frequency cepstrum coefficient.

In this case, the vector quantization of the characteristic parameter such as Mer-Frequency cepstrum coefficient may be implemented by PCA, SVM or WT.

In above schema, the pre-processing of the voice message and the characteristic parameter extraction of the pre-processed signal may be performed in the background of a mobile terminal.

Figure 3:
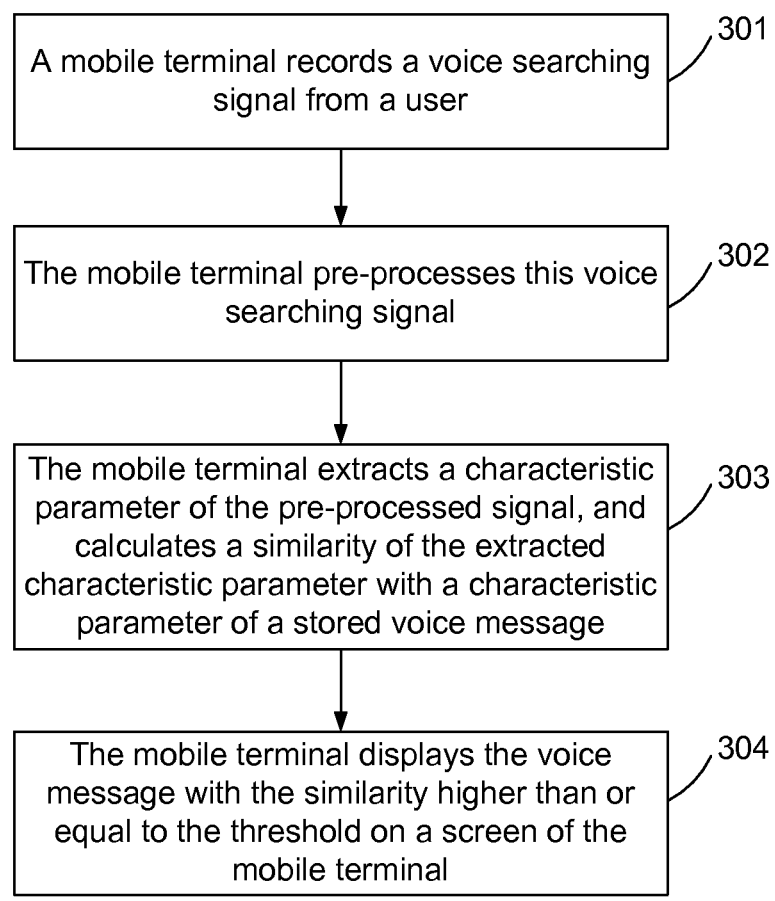
FIG. 3 is a flow chart of the searching method implemented by the mobile terminal with a built-in voice message searching function according to the embodiments of the disclosure.

FIG. 3 is a flow chart of the searching method implemented by the mobile terminal with a built-in voice message searching function according to the embodiments of the disclosure. As shown in FIG. 3, the method includes:

Step 301: a mobile terminal records a voice searching signal from a user.

The voice searching signal may be a key word or key sentence of a voice message.

Step 302: the mobile terminal pre-processes this voice searching signal.

This step may specifically include: normalizing amplitude, frequency and phase of the voice searching signal into a unified amplitude, frequency and phase respectively; sampling the normalized signal at a low frequency; filtering aliasing frequency components from the down-sampled signal; then, amplifying the filtered signal; determining a starting point and an ending point of a valid voice signal in the amplified signal; finally, filtering noise from the valid voice signal.

Here, the low frequency in the low-frequency sampling is higher than twice of a maximum frequency of this signal.

Step 303: the mobile terminal extracts a characteristic parameter of the pre-processed signal, and calculates a similarity of the extracted characteristic parameter with a characteristic parameter of a stored voice message.

Preferably, the calculation of a similarity between the extracted characteristic parameter and the voice characteristic parameter starting from the starting point of the valid voice in the voice message is performed, and each time it turns to an immediately next syllable such as "hao", and then the calculation of a similarity between the extracted characteristic parameter and the voice characteristic parameter at this syllable is performed, until the ending point of the valid voice in the voice message, a calculated largest similarity is taken as the similarity of this voice message.

The characteristic parameter includes: linear prediction coefficient, linear prediction cepstrum coefficient and Mer-Frequency cepstrum coefficient, etc.

Taking Mer-Frequency cepstrum coefficient as an example, extracting the characteristic parameter may specifically include:

performing framing, windowing and Discrete Fourrier Transform DFT on the pre-processed signal to obtain spectrum distribution information; squaring the spectrum amplitude to obtain an energy spectrum; performing filtering on the energy spectrum with a triangular filter bank in Mer-scale and then performing Discrete Cosine Transform DCT on the filtered energy spectrum to obtain the Mer-Frequency cepstrum coefficient; performing a vector quantization on the Mer-Frequency cepstrum coefficient.

In this case, the vector quantization of the characteristic parameter such as Mer-Frequency cepstrum coefficient may be implemented by PCA, SVM or WT.

The method of the similarity calculation may be Euclidean distance similarity calculation, cosine similarity calculation, Manhattan distance calculation or grey relational degree calculation, etc.

Taking Euclidean distance similarity calculation as an example, the similarity calculation is specifically:

$$d_2(X, Y) = \frac{1}{K} \sum_{i=1}^{K} (x_i - y_i)^2$$

$$Xi = \{x_{i1}, x_{i2}, \ldots, x_{ik}\}$$

$$Yi = \{Y_{j1}, Y_{j2}, \ldots, Y_{jk}\}$$

where, $X_i$ is the characteristic parameter vector of the signal, $Y_i$ is the characteristic parameter vector of one voice message, $d_2(X,Y)$ is Euclidean distance similarity;

$$\sum_{i=1}^{K}$$

is a summation symbol, i=1, 2, 3 . . . K. The Euclidean distance similarity characterizes the level of similarity between the signal and the voice message. A larger Euclidean distance measurement represents a smaller similarity, and a smaller Euclidean distance measurement represents a larger similarity.

Step 304: the mobile terminal displays the voice message with the similarity higher than or equal to the threshold on a screen of the mobile terminal.

Here, the tabulation includes at least one voice message item arranged longitudinally on the screen of mobile terminal. The voice message item includes a voice message connection identifier, and may further include one or more of voice message creation time, voice message duration, voice message size. The voice message connection identifier, the voice message creation time, the voice message duration, and the voice message size are arranged on the screen of the mobile terminal horizontally.

The threshold herein is a set similarity threshold value. A similarity greater than or equal to the threshold signifies existence of the voice searching signal in the voice message, and a similarity smaller than the threshold signifies absence of the voice searching signal in the voice message.

When there are more than one voice messages with similarities greater than or equal to a threshold, this step further includes: the mobile terminal prompts a user whether a further search is to be performed.

Accordingly, steps 301 to 304 are repeated when the user determines to perform a further search. Here, the voice searching signal which has been further recorded is a second key word or second key sentence. The similarity further calculated is the similarity between the second key word or second key sentence and previously searched out voice messages with the similarity higher than or equal to the threshold, in which the second key word or second key sentence is different from the key word or key sentence used in the previous searching.

The above descriptions are just preferred embodiments of the disclosure, without limiting the scope of the disclosure.

The invention claimed is:

1. A mobile terminal with a built-in voice message searching function, comprising: a processor and a memory for storing instructions, which when executed cause the processor to, record a voice searching signal from a user;
pre-process the voice searching signal;

extract a characteristic parameter of the pre-processed signal, calculate a similarity of the extracted characteristic parameter with a characteristic parameter of a stored voice message starting from a starting point of a valid voice in the voice message, and send the voice message with a similarity higher than or equal to a threshold; and display the voice message with the similarity higher than or equal to the threshold on a screen of the mobile terminal, wherein the instructions when executed further cause the processor to store the characteristic parameters of voice messages and send the characteristic parameter of each of the voice messages for similarity calculation, wherein the characteristic parameter comprises: Mer-Frequency cepstrum coefficient; and wherein the similarity calculation comprises: Euclidean distance similarity calculation, wherein the instructions when executed further cause the processor to normalize amplitude, frequency and phase of the voice searching signal into a unified amplitude, frequency and phase respectively;

sample the normalized signal at a low frequency;

filter aliasing frequency components from the down-sampled signal;

amplify the signal after the aliasing frequency component filtering;

determine a starting point and an ending point of a valid voice signal in the amplified signal; and filter noise from the valid voice signal, and send the signal after the noise filtering for signal matching.

2. The mobile terminal according to claim 1, wherein the instructions when executed further cause the processor to prompt the user whether a further search is to be performed when there are more than one voice messages with similarities higher than or equal to the threshold.

3. The mobile terminal according to claim 1,
wherein the unified amplitude, frequency and phase are set respectively to be audible amplitude, frequency and phase; and
wherein the low frequency in the low-frequency sampling is higher than twice of a maximum frequency of the sampled signal.

4. A searching method of a mobile terminal with a built-in voice message searching function, comprising:

recording a voice searching signal from a user, and pre-processing the voice searching signal;

extracting a characteristic parameter of the pre-processed signal, and calculating a similarity of the extracted characteristic parameter with a characteristic parameter of a stored voice message starting from a starting point of a valid voice in the voice message; and displaying the voice message with the similarity higher than or equal to the threshold on a screen of the mobile terminal, wherein the step of extracting further comprises:

storing the characteristic parameters of voice messages and sending the characteristic parameter of each of the voice messages for similarity calculation, wherein the characteristic parameter comprises: Mer-Frequency cepstrum coefficient; and wherein the similarity calculation comprises: Euclidean distance similarity calculation, wherein the step of pre-processing the voice searching signal comprises:

normalizing amplitude, frequency and phase of the voice searching signal into a unified amplitude, frequency and phase respectively;

sampling the normalized signal at a low frequency;

filtering aliasing frequency components from the down-sampled signal and amplifying the filtered signal;

determining a starting point and an ending point of a valid voice signal in the amplified signal; and filtering noise from the valid voice signal.

5. The method according to claim 4, wherein the method further comprises: when there are more than one voice messages with similarities greater than or equal to a threshold, prompting, by the mobile terminal, a user whether a further search is to be performed.

6. The method according to claim 4, wherein the method further comprises: when there are more than one voice messages with similarities greater than or equal to a threshold, prompting, by the mobile terminal, a user whether a further search is to be performed.

* * * * *